United States Patent [19]

Bianchi

[11] Patent Number: 5,582,572
[45] Date of Patent: Dec. 10, 1996

[54] METHOD AND PLANT FOR RENDERING SOLID WASTE INERT AND FOR ITS SUBSEQUENT DEFINITE STORAGE

[76] Inventor: Alessio Bianchi, Via F. Acri, 13, 40126 Bologna, Italy

[21] Appl. No.: 337,267

[22] Filed: Nov. 10, 1994

[30] Foreign Application Priority Data

Nov. 12, 1993 [IT] Italy .................. BO93A0459

[51] Int. Cl.⁶ ............................................ B09B 3/00
[52] U.S. Cl. ............................. 588/252; 405/129; 404/91
[58] Field of Search ....................... 588/252, 250; 404/91; 405/128

[56] References Cited

U.S. PATENT DOCUMENTS

| | | | |
|---|---|---|---|
| 3,654,048 | 4/1972 | Bathgate . | |
| 4,252,667 | 2/1981 | Stegmaier et al. | 252/301.1 W |
| 4,335,974 | 6/1982 | Wirtgen | 404/91 X |
| 4,435,290 | 3/1984 | Lindorfer et al. | 588/250 |
| 4,453,856 | 6/1984 | Chiostri et al. | 404/91 |
| 4,473,320 | 9/1984 | Register | 404/91 |
| 4,623,469 | 11/1986 | Conner | 588/252 |
| 4,663,086 | 5/1987 | Lefillatre | 252/628 |
| 5,397,389 | 3/1995 | Glynn, Jr. | 588/252 X |

FOREIGN PATENT DOCUMENTS

| | | |
|---|---|---|
| 929036 | 6/1973 | Canada . |
| 240419 | 10/1987 | European Pat. Off. . |
| 550303 | 7/1993 | European Pat. Off. . |
| 2318487 | 3/1977 | France . |
| 150068 | 8/1981 | German Dem. Rep. . |
| 2240119 | 1/1974 | Germany . |
| 560246 | 3/1975 | Switzerland . |
| 1730056 | 4/1992 | U.S.S.R. . |

*Primary Examiner*—Stephen J. Novosad
*Attorney, Agent, or Firm*—Fay, Sharpe, Beall, Fagan, Minnich & McKee

[57] ABSTRACT

The method for rendering solid waste inert and for its subsequent definitive storage and a plant which allows this to be done, provide an initial stage in which the waste is reduced and/or prepared so that it can be covered then enveloped in substances which can form a coating on it; a second stage involving the mixing of waste prepared in the afore-mentioned manner with a bitumen-based substance; a third stage for the depositing and/or spreading of the amalgam obtained during the mixing stage directly below or above the ground; a fourth stage for compacting the amalgam so that the bitumen-based product solidifies, completely sealing in the waste and increasing its impermeability, thus preventing any contact between the waste and the surrounding environment.

17 Claims, 2 Drawing Sheets

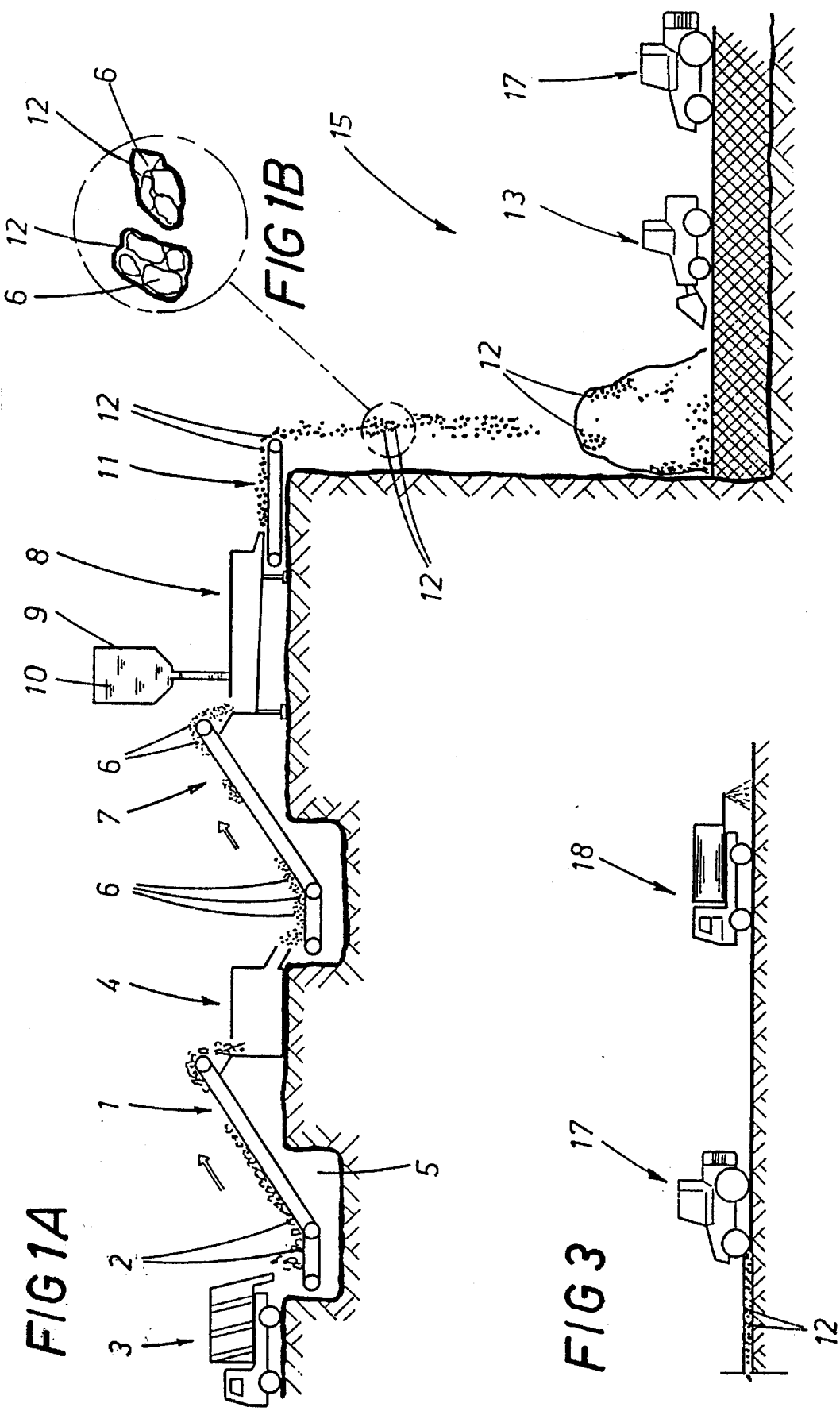

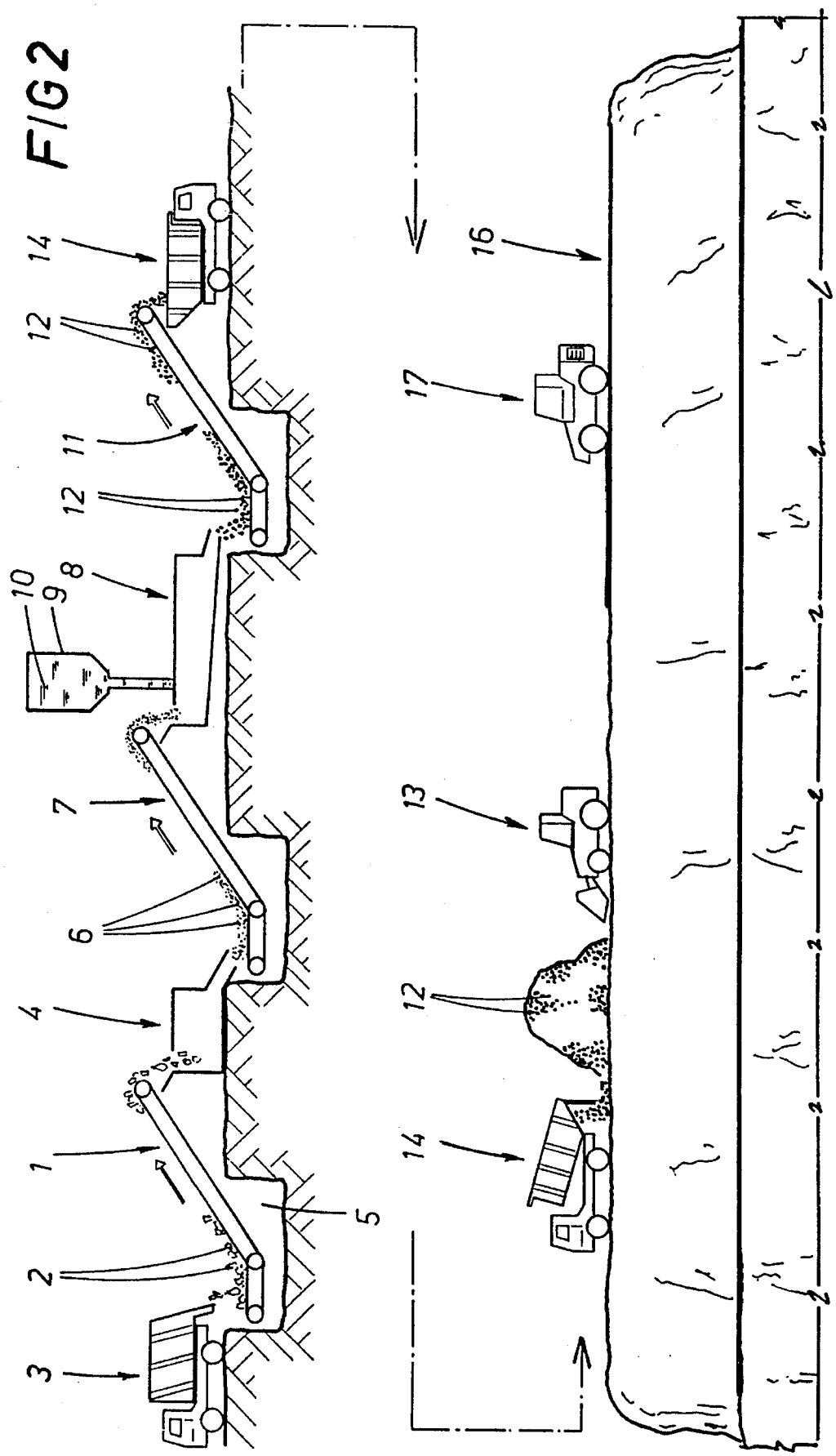

METHOD AND PLANT FOR RENDERING SOLID WASTE INERT AND FOR ITS SUBSEQUENT DEFINITE STORAGE

BACKGROUND Of THE INVENTION

This invention relates to the methodologies and technologies relative to solid waste disposal, for both municipal and industrial waste, and concerns a method and relative plant to render such waste inert and for its subsequent storage.

Waste disposal in general has always been a serious problem from both a social and environmental viewpoint. The need to solve this problem has, with the passage of time and the onset of an industrial era which has brought both an increase in the quantity of waste produced and types of wastes for which disposal is increasingly complex, gradually become more pressing, even urgent. In fact, for centuries, waste has been considered something that must be removed and hidden, leaving to Nature the basic duty of its definitive disposal, yet this concept has proved increasingly incompatible with the constantly growing awareness of the requirements for environmental protection.

To correctly establish the most correct method to follow for optimum waste disposal, an analysis of all aspects of the problem faced is indispensable. Before any theoretical or practical operation, it is fundamentally important that a careful quantitative and qualitative analysis of the waste to be treated be carried out. Such an analysis must be dynamic, that is to say, must be repeated with the passage of time, in order to monitor trends in the production of waste to be disposed of.

These quantitative and qualitative analyses of waste allow a sufficiently accurate identification of the most appropriate waste disposal method, and of the products which may be obtained from waste treatment and their potential as pollutants once stored. Moreover, they are indispensable when selecting the most appropriate sites for waste disposal and for predicting environmental conditions following the set up of the disposal process.

It is, in fact, very important to predict and control the possible negative impact on the environment, for example water and atmospheric pollution, caused by sludges, odors, biological gases, etc. The impact must be predicted with precision, obviously depending on the method used, whether it be incineration, composting or controlled land disposal, in order to reduce it to an absolute minimum.

A prediction of the possible negative impact on the environment is of significant importance not only during implementation of the disposal method, but also and above all, for the subsequent recovery of the zone in which set up of the disposal plant is planned. In fact, for modern plant, one of the objectives is recovery of the area covered by the disposal plant once the plant is finally disactivated. By this, we refer to reconstruction of the landscape, so that it is returned to its former state, before the degradation provoked by the plant; or creation of an alternative landscape for new, different purposes, according to requirements, whether they be recreational, residential or cultural, proposed by the local community or intended for productive re-use of various types.

One of the major factors for consideration when studying the most suitable disposal plant is the quantity of waste to be disposed of, and the most elementary solution, above all for the disposal of huge quantities of waste, is that of controlled land disposal sites. These sites, for definitive waste storage, are a modest improvement on the improvised dumps of several decades ago. In fact, even today, the usual idea of the localized container in a segregated zone, to be sealed off as far as possible so that degeneration of the waste occurs without excessive effects on the surrounding land,. is still often applied.

However, the problem appears to lack a real solution, since at the end of each treatment currently known, and especially with land disposal, it remains necessary to dispose of further waste, such as sludges, dense leachates, etc., definitely in reduced quantities, yet given their toxic concentration, creating problems for their definitive storage.

Thus, for correct waste disposal, the opportunity to pre-establish those products which will immediately be separated out assumes great importance, preferably according to the four major product groups, that is to say: organic or assimilated substances, ferrous and non-ferrous metals, plastics and inert materials such as terra-cotta, pottery and glass; and the necessity of separating at the source the greatest possible number of products, through installation of specific, easily-recognizable containers. Also to be taken into account, are those materials from which products will be recycled, those to be eliminated and those to be preserved under control, so that re-usable materials do not go to the land disposal sites and become irretrievable, making their management unreliable.

After the quantitative and qualitative analyses of the waste to be disposed of, numerous factors apply during the design stage of any land disposal site, and particular attention must be paid to the study of hydrogeological and physical factors, concerning protection of and impact on the environment.

The first factors, that is to say, hydrogeological and physical, are without doubt the most important and delicate from all viewpoints and, in particular, encompass the need to guarantee protection of the water, air and land. As regards water, particular care must be taken with respect to subterranean sources, the levels of the water-table, large bodies of water and the surface water networks, by avoiding any substances filtering from the land disposal site. Protection of the air means avoiding fumes, vapors and fermentation, and controlling the flare bleeders for elimination of any gaseous processes, whilst protection of the land means defending it from the emission of chemicals or dusts which could modify its characteristics, drive away the fauna and degrade its flora and crops irreversibly.

To better understand how we can predict the safeguarding of any type of water, a knowledge of the various operations carried out at the land disposal sites and the processes which develop spontaneously within the waste products is required. First and foremost, the waste is divided for the recycling of selected materials, then it is stored and compacted and, finally, daily covered with soil to prevent contact with oxygen which encourages chemical alteration, or putrefaction, of the waste. During the aforementioned operations, the waste, for natural reasons, is subject to aerobic decomposition, in the presence of air, and anaerobic decomposition, in the absence of air, resulting in the formation of leachate or sludges and bio-gas.

It is, therefore, evident that the greatest threat to water of any kind is presented by the leachate. To avoid the leakage of leachate, the collection site must therefore remain completely isolated from surface waters and protected from landslides and run-off, which may be constant or seasonal, caused for example, by rainfall and snow. The earliest land disposal sites were often made impermeable using compact clays or clays with added bentonite, cement, asphalt or limestone which, as well as adding to the transportation costs of heavy raw materials, were constantly subject to the risk of cracking due to changes in temperature, humidity or internal stress. Artificial materials were subsequently employed, such as laminated rubber or plastic sheets of various types, including butyl rubber, chlorinated polyethylene CPE, plasticized PVC, etc., few of which, however, proved capable of long-term resistance to the complex fermentation and mechanical strain to which they were subjected. Various types of new sheets are currently used with some success, for example plasticized or polyolefin-based PVC, which have significant specific properties and, in particular, a good sealing capacity.

To improve the results of impermeabilization and avoid the leakage of leachate, it is also necessary to provide suitable leachate collection networks, to protect the water; for bio-gas, to protect the atmosphere and soil. As regards the leachate collection network, it should be remembered that its size must be planned not according to the predicted quantity of leachate generated by the waste, but according to the less predictable maximum quantities of rainfall and snow to be collected. Collection sites are, in fact, always open-air, and therefore subject to rainfall and snow which penetrate the sites through the various coverings of soil and the various layers of waste, generating and carrying with them further quantities of leachate, thus washing or leaching the waste. The presence of the collection networks is equally important in reducing the stress on the collection site impermeabilization materials, since they reduce the overall weight of the waste by carrying off the leachate.

The drained bio-gas and leachate are then, preferably, used: the first in collateral generation plants, for example for the generation of energy, the second for periodic irrigation of the waste. Irrigation of the waste using leachate and other operations, such as surface drainage and particular geometries which encourage rainfall and snow to enter the collection sites, make the land disposal sites dynamic in the sense that they accelerate the natural waste transformation processes, processes which would occur even without such operations, but over a much longer period of time, unacceptable for efficient disposal of the waste.

Acceleration of the transformation processes is also obtained through a suitable preparation of the incoming waste, a preparation which consists in crushing, screening and separation of the waste. Crushing, in particular, can be carried out in various ways and is extremely useful to speed up all subsequent daily waste screening, separation and compacting processes. Compacting and the subsequent covering with layers of soil and compost, irrigation with leachate and the optional spreading of disinfectants helps to reduce the proliferation of rats, flies, birds and other animals, and allows a significant reduction in the volume of the material, which can also be bound better, containing the parts which may be lifted by the wind. The subsequent spreading, if carried out, of loose calcareous substances allows the formation of a kind of surface "crust" particularly suitable for sealing the storage site cap for brief periods of time or in urgent situations, such as in the presence of high winds, during the passage of flocks of birds and similar situations which would cause the waste to spread or attract animals.

Again considering the protection of water, not only should the collection site be made impermeable for the reasons outlined above, but it is a good idea to divert surface waters around or to a suitable distance from the collection site. In this case, the extent of the diversion should again take into account snow and rainfall which, if not predicted at their maximum values, may completely invalidate the distances, especially in the case of violent storms or downpours.

The seriousness of the problem of waste disposal, and the multiplicity of problems generated by it, can be understood if we observe the numerous texts and existing patented documents on the subject.

The SU 1,730,056 patent, for example, includes a discussion of a treatment for municipal and industrial waste water sludges, end envisages the addition of asphalt or bitumen to the sludges being treated in order to simplify the process. The treatment can effectively be applied to sludges with high chemical and biological oxygen demands, and allows efficient re-use of all sludge mass.

The U.S. Pat. No. 4,252,667 patent aims to allow the safe transfer of radioactive wastes mixed with bitumen from a worm screw extruder into containers, to reduce the danger of combustion generated by the open containers filled with hot bitumen, and to reduce the cooling time for the filled containers.

The CA 929,036 patent aims to provide a waste disposal plant which disposes of waste without involving the separation of its constituents, and which achieves this aim with a plant that includes crushers, to reduce the volume of the waste to a preset value, a waste incinerator, conveyors to transport the crushed waste mixed with combustible materials to the incinerator, pulverizers to crush the ash which arrives from the incinerator to the desired dimensions, mixers and means of transport or conveyors between the pulverizers and mixers, and storage means for a material such as bitumen which, with the crushed material, forms a construction material.

The CH 560,246 patent is based on a method for the disposal of toxic and polluting materials by fixing them in, or mixing them with liquid bitumen, cement and similar hardening materials, and dictates that the waste be fixed in the bitumen emulsions by mixing in the waste during production of the emulsion.

The FR 2,318,487 patent application aims to provide a procedure for the elimination of radioactive synthetic waste by encapsulating it in a bituminous consolidating substance which avoids the problems of current procedures, such as high costs, the necessity of drying in several stages and any chemical transformations which may occur.

The object of the DD 150,068 patent is a method for shaped article production from thermoplastics, especially plastic waste products, mixed with ground bitumen, and aims to improve the mixability of the plastics during production of shaped articles, starting with mixed plastic waste materials.

The object of the DE 2,240,119 patent is a method and device for the disposal of gaseous filtering elements contaminated with medium - high level radiation, from which the water is removed, and which are mixed with bitumen in precise quantities.

The object of the EP 550,303 patent application is to convert the residue of incineration of domestic waste into a useful product; the basis of this patent is the production of a product based on the said residue, its application in road-building, and the method for treating the waste and obtaining the product to be used.

The object of the EP 240,419 patent application is a procedure for coating powdery or granular radioactive or toxic waste using bitumen granules, and envisages that both the waste and bitumen be introduced into an extruder with liquid flux and the extruder be heated to produce a liquid and powder and/or granular bitumen aggregate. The aggregate is then placed in a container and allowed to solidify.

The U.S. Pat. No. 3,654,048 patent examines a procedure for the disposal of municipal waste, which envisages that the waste be shredded and compressed into bales, then bound with suitable straps, after having been thoroughly soaked; and envisages the use of bitumen or a similar product instead of water, so that the bales have a high density. By avoiding the use of water, the rate of decomposition of the waste due to anaerobic processes can be reduced, and the cost of binding the bales is reduced, since they are much more compact, even without the relative straps.

In light of the above, two main aspects emerge: the first being that bitumen is often used as a mixer or binder, in particular for radioactive wastes; the second, that the wastes, with the exception of those which are radioactive, are transported to isolated zones, covered with soil and their natural transformation processes, that is to say, fermentation and decomposition, are left to take place or are accelerated, with the consequences described above. It is essential to point out that the patents examined on this subject envisage the use of bituminous materials only as an element to allow improved compacting of the waste materials, which are then subject to the problems outlined in the introduction herein.

Starting from this assumption, that is to say, that the waste materials are always left active and, therefore, dangerous, even if they are hidden and/or controlled, the aim of this invention is to provide a new method of waste disposal which allows the waste materials to be rendered definitively inactive, in a simple, economic fashion.

Another aim of this invention is to provide a method of waste disposal which, at least in part, allows the use of pre-existing plants, thus accelerating the implementation of the said method.

SUMMARY OF THE INVENTION

This invention, as described in the claims, solves the problem with a method capable of rendering solid wastes inert for their subsequent definitive storage, which envisages the reduction and/or preparation of the waste so that it can be mixed with a bitumen-based product or substance, fluid or rendered fluid, to create an amalgam or aggregate in which the said waste is protected by a layer of the said bitumen-based product or substance, which at least isolates it from the external environment; so that the said amalgam or aggregate can be deposited and/or spread above or below ground for its definitive storage. The method is achieved in a plant which includes, at least, means for reducing and/or preparing the solid waste, means for mixing the solid waste thus prepared with a bitumen-based product or substance, fluid or rendered fluid, to create an amalgam or aggregate in which the said waste is protected by a layer of the said bitumen-based product or substance and at least isolated from the external environment.

BRIEF DESCRIPTION OF THE DRAWINGS

The invention is described in more detail below, with the aid of the accompanying drawings, which illustrate an embodiment by way of example only, and in which:

FIG. 1A is a diagram of the plant according to this invention, with storage of the waste, rendered inert, below ground;

FIG. 1B is an enlarged view of the amalgam or aggregate;

FIG. 2 is a diagram of the plant according to this invention, with storage of the waste, rendered inert, above ground;

FIG. 3 is a diagram of an operating stage which can be applied in both of the plants, as at points 1 and 2.

DESCRIPTION OF THE PREFERRED EMBODIMENTS

The method, according to this invention, for rendering inert solid waste, whether municipal or industrial, and for its subsequent definitive storage, consists in a series of operational stages which can be carried out in either of the plants illustrated in FIGS. 1 and 2.

The first stage is that of reduction and/or preparation of the waste so that it can then be covered with substances intended to form a coating on its surface. This reduction and/or preparation stage can be carried out by crushing the waste, to reduce it to pieces of uniform size or granulometry, to facilitate and render more efficient the subsequent stage. This stage also allows the crushing of any containers in which the waste may be stored. In fact, at least solid municipal waste is, for the most part, and preferably, contained in plastic bags, well-sealed to avoid it spreading into the surrounding environment and reduce both the unpleasant odors which emanate from collection bins and the number of animals attracted by the waste itself.

Then comes the stage in which the crushed waste is mixed with a bitumen-based product or substance. The said bitumen-based substance is available in fluid form, or can be rendered fluid before or during the mixing stage. Thus, an amalgam or aggregate is obtained, in which the waste is protected by a layer of the bitumen-based product or substance and at least isolated from the external environment. More precisely, the mixing stage must ensure that the individual pieces or groups of waste pieces are completely encapsulated in or coated with a layer of the bitumen-based product. Two types of results are obtained: the first, that waste treated in this way is at least completely isolated from the external environment; the second, that the pieces of waste are isolated from each other as well as from the external environment. This product may be one of various types, for example, it may be pure bitumen, bitumen with additives, anionic or cationic bituminous emulsions, etc. The mixing may be carried out in rotating drums, cold or hot, depending on the type of bitumen-based product used, the type of waste to be rendered inert and its intrinsic degree of humidity. As to the quantity of bitumen-based product to use, this varies according to the average composition of the waste and is preferably equivalent to 4–10% of the weight of the waste itself.

The amalgam or aggregate thus obtained is now ready to be deposited and/or spread directly above or below ground for its definitive storage. The fact that the amalgam or aggregate is deposited and/or spread directly above or below ground means that the ground, in general terms, requires no preparation to receive the said amalgam or aggregate, since the waste encapsulated in it is completely isolated from the surrounding environment and, therefore, completely inert, being impermeable to the external environment. More specifically, spreading can be carried out below ground, for example in abandoned quarries or natural depressions (see FIG. 1), or above ground, to create hills or similar landscape features (see FIG. 2).

Definitive storage of the amalgam or aggregate is effected by spreading the amalgam or aggregate evenly, in layers, in the zone in which it is to remain permanently.

After spreading, the layer of amalgam or aggregate is subjected to a compacting stage, using rollers or bulldozers of suitable weight, to render it compact and further reinforce the bitumen-based product coating on the individual or groups of waste pieces, further separating them from each other and from the external environment. The compacting stage is also designed to induce the solidification of the bitumen-based product, allowing improved hardening of the amalgam or aggregate.

The mixing stage above all, and the compacting stage, are very important, since the success of the entire method depends chiefly upon them. In fact, for the correct implementation of the method disclosed by this invention, it is indispensable that the individual or groups of crushed pieces of waste be completely covered and enveloped or encapsulated in the bitumen-based product, and that they be completely cut off from the surrounding environment. Further, the compacting stage is just as important in causing the mass of amalgam or aggregate to harden once it has been spread in layers.

Compacting may be followed by a stage, useful but not indispensable, which involves covering the compact layer by applying a jet of a hot bitumen-based product, to further impermeabilize the compact layer. This stage may be carried out at the end of the day, or when the final compact layer reaches a thickness of 30–50 cm. The quantity of hot bitumen-based product preferable for coverage is approximately 1–2 Kg/m$^2$.

An examination of the accompanying drawings, in particular FIG. 1, reveals that the plant able to put into effect the method described in this invention includes a first conveyor 1, which receives the solid waste 2 from trucks 3, usually those designed for municipal waste collection in towns, and transports it to a crusher 4. In figure 1, the conveyor loading zone is located in a pit 5, for the sole purpose of establishing a difference in height between the trucks 3 and the loading zone. The crusher 4 unloads the crushed waste 6 onto a second conveyor 7, which in turn, unloads it into a mixer 8, of the rotating drum type, for example. A hopper 9 containing a bitumen-based product 10 is also located at the mixer 8 infeed. At the mixer 8 outfeed is a third conveyor 11, which unloads the amalgam or aggregate 12 produced by the mixer 8 at a pick-up zone for the site machinery, such as scrapers 13. The amalgam or aggregate 12 is loaded onto dump trucks 14, which transport it to its final destination, where it is definitively stored in layers by spreading and compacting.

The final destination may be below ground, for example in an abandoned quarry 15, as illustrated in FIG. 1; or above ground, for example to create a hill 16, as illustrated in FIG. 2. In FIG. 1 the amalgam or aggregate 12 is unloaded by the conveyor 11 directly onto the floor of the quarry 15, where the scrapers 13 spread it evenly over the floor of the abandoned quarry 15. In contrast, in FIG. 2, the conveyor 11 unloads the amalgam or aggregate 12 onto dump trucks 14, which transport it and unload it directly on the hill 16, where the scrapers 13 spread it evenly.

Irrespective of the destination, the amalgam or aggregate 12 is then compressed by a road roller 17 of suitable weight.

Finally, FIG. 3 illustrates the useful but not indispensable stage in which the compact layer of amalgam or aggregate 12 is covered with a hot bitumen-based product by a special tank truck 18.

Implementation of this method brings numerous advantages, including the elimination of all operations necessary to protect surface waters and the water-table from pollution, the elimination of operations for the drainage and collection of leachate, the elimination of the formation of bio-gas, the elimination of the proliferation of rats, insects, stray animals, birds, etc., and the elimination of unpleasant odors. All of this is possible because each piece of waste is coated or covered by the bitumen-based product, which forms a capsule around it. In this way, each piece of waste is in contact with the bitumen-based product only, which does not react with it, rather than with air or water or similar external agents which, in contrast, would react. The said bitumen-based product is not only impermeable, but also has a high long-term resistance to all types of agents, especially atmospheric, as can be seen in the case of asphalt roads. This means, therefore, that the bitumen-based product which covers, coats or encapsulates the pieces of waste, acts as a lasting barrier between the pieces of waste and all reactive agents, such as snow and rainfall or air.

Another advantage of this invention is the possibility of completely recovering the area used to store waste treated using this method, for any purpose. It is, in fact, sufficient to apply soil to cover it adequately and restore the organic surface layer and the drainage and irrigation systems. The mass of waste thus treated, in fact, behaves as a single monolithic body, completely impermeable and inert.

What is claimed:

1. A method for rendering solid active municipal and industrial waste inert and for subsequent definitive storage of said waste, comprised of at least the following successive operating stages;

preparation of the active waste so as to render possible covering and subsequent enveloping of the waste with substances designed to form a coating on the waste, mixing of the active waste thus prepared with a bitumen-based fluid substance to create an aggregate in which said waste is protected by a layer of the bitumen-based substance, and is at least isolated from the external environment, and depositing said aggregate for its definitive storage.

2. A method as defined in claim 1, wherein the said preparation stage consists in crushing the waste, to reduce it to pieces of generally uniform size and granulometry.

3. A method as defined in claim 2, wherein the mixing stage creates an aggregate in which the individual waste pieces are completely coated with a layer of said bitumen-based substance, at least completely isolating said waste from the external environment.

4. A method as defined in claim 2, wherein the mixing stage creates an aggregate in which the individual waste pieces are completely coated with a layer of the bitumen-based substance, completely isolating said waste pieces both from other waste pieces and from the external environment.

5. A method as defined in claim 1, wherein said depositing stage is followed by the definitive storage of said aggregate in layers.

6. A method as defined in claim 5, wherein the layers obtained by depositing the aggregate are compacted, thus further covering the individual pieces or groups of pieces with the bitumen-based product, increasing the impermeability between the pieces themselves and between the pieces and the external environment; and inducing the solidification of the bitumen-based product, improving the hardening of the aggregate.

7. A method as defined in claim 6, wherein the compacting stage is followed by a stage involving the covering of each compact layer by the application of a jet of a hot bitumen-based product on its surface, to provide further impermeability.

8. A method as defined in claim 1, wherein the prepared solid waste is mixed with a quantity of bitumen-based product equivalent to 4–10% of the weight of the prepared waste.

9. A method as defined in claim 5, wherein each layer of the aggregate has a maximum height of 30–50 cm.

10. A method as defined in claim 7, wherein each compact layer is covered by applying a jet of a hot bitumen-based product to its surface, the quantity of said product being 1–2 Kg/m$^2$.

11. A method as defined in claim 1, wherein the said mixing stage is carried out cold or hot, depending on the type of bituminous product used, the type of waste to be rendered inert and its intrinsic humidity.

12. A method as defined in claim 6, wherein should a bitumen-based product containing water be used, the compacting stage is also designed to cause the water contained in the said bitumen-based product to leave the aggregate.

13. A plant for the implementation of the method as defined in the previous claims, wherein the plant includes, at least, means for preparing the solid waste so as to render it suitable to be covered and subsequently enveloped with substances which can form a coating on it; mixing means, for mixing the solid waste thus prepared with a bitumen-based fluid substance to create an aggregate in which said waste, thus prepared, is protected by a layer of said bitumen-based substance and is so isolated from the external environment.

14. A plant as defined in claim 13, wherein the plant also includes dispersal means, to evenly distribute said amalgam or aggregate above or below ground for its definitive storage in layers; compressing means, to evenly compress, compact and solidify the said layer of aggregate, so that the individual pieces of waste are further covered with the said bitumen-based product and are completely isolated from and impermeable to the external environment; and distributing means, to cover the said compact layer with a hot bitumen-based product, providing further impermeability.

15. A plant as defined in claim 13, wherein the said means for preparing the solid waste are crushers.

16. The method of claim 1 wherein said aggregate is deposited below ground.

17. The method of claim 1 wherein said aggregate is deposited above ground.

* * * * *